(No Model.)
J. W. CLOWES.
DENTISTRY.
No. 446,769. Patented Feb. 17, 1891.
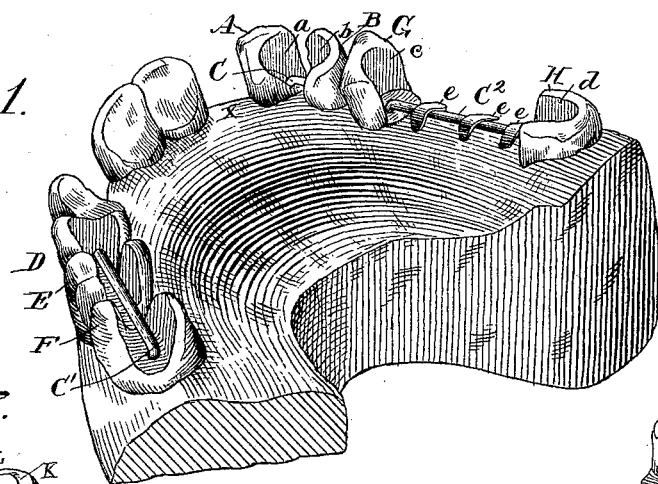
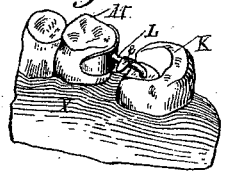
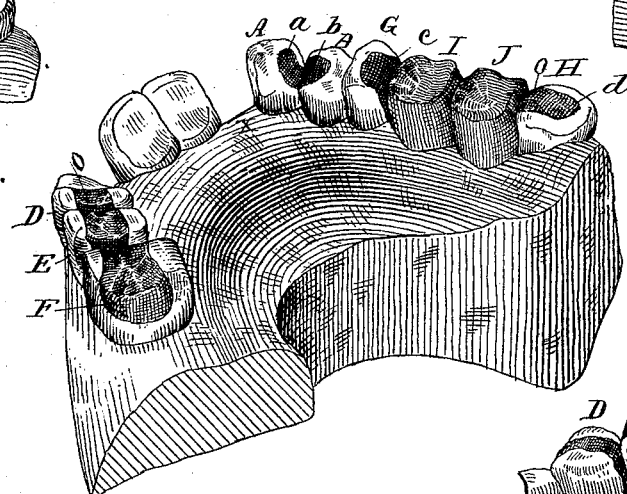
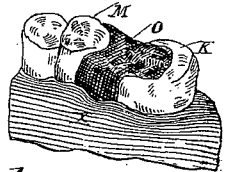
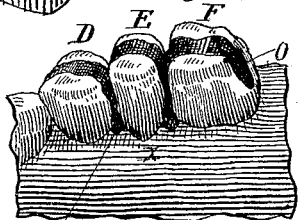
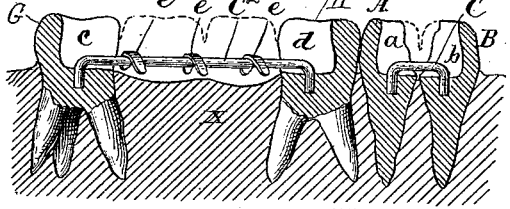
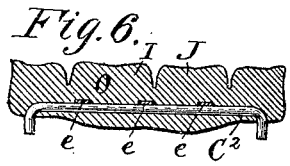
WITNESSES:
J. Henry Thiberath
C. Sedgwick
INVENTOR:
J. W. Clowes
BY Munn & Co.
ATTORNEYS.
THE NORRIS PETERS CO., PHOTO-LITHO., WASHINGTON, D. C.

UNITED STATES PATENT OFFICE.

JOSEPH W. CLOWES, OF NEW YORK, N. Y.

DENTISTRY.

SPECIFICATION forming part of Letters Patent No. 446,769, dated February 17, 1891.

Application filed November 1, 1890. Serial No. 370,006. (No model.)

*To all whom it may concern:*

Be it known that I, JOSEPH W. CLOWES, of New York city, in the county and State of New York, have invented a new and useful Improvement in the Art of Dentistry, of which the following is a specification, reference being had to the accompanying drawings, forming a part thereof, in which—

Figure 1 is a perspective interior view of a superior maxilla, showing teeth prepared according to my improvement for receiving the plastic material of which the fillings are formed. Fig. 2 is a perspective view of a superior maxilla, showing teeth with my improvements applied. Fig. 3 is an exterior view of a section of the superior maxilla, showing teeth with my improvements applied. Fig. 4 is a perspective view of three contiguous teeth having large cavities and provided with my improvement. Fig. 5 is a longitudinal section of one side of the maxilla, showing the form of the teeth-cavities and the position of the anchors or supports in the cavities. Fig. 6 is a longitudinal section of the artificial teeth and fillings formed integrally of one body of material. Fig. 7 is a section of the maxilla, showing in perspective the cavity of a decayed natural tooth prepared for filling in connection with a stay-plate reaching to the next adjacent tooth; and Fig. 8 shows the same parts after the plastic filling has been inserted.

Similar letters of reference indicate corresponding parts in all the views.

The object of my invention is to provide a simple and effective means by which broken, loose, and dilapidated natural teeth may be preserved from decay and helped to become mutually supporting to each other.

My invention consists in fillings inserted in cavities in approximate faces of contiguous teeth, said fillings being formed of a single body of material connecting the teeth so that they mutually support each other. It also consists in fillings of plastic material inserted in cavities in approximate faces of the teeth and extending between and across the teeth and down upon and closely contacting with the gums, all as will be hereinafter more fully described.

In describing my invention I will first refer to a case of connected fillings in approximate faces of two contiguous teeth. I will then describe a series of connected fillings, and afterward a case in which two artificial molar teeth are supported by and formed integrally with the fillings of two natural teeth; but I do not confine my invention to these particular cases, as it may be modified as circumstances may require.

The plastic material which I have so far found to be best adapted for the purpose of my invention is the ordinary dental amalgam; but I do not limit myself to this material, as any other suitable plastic material may be used which sufficiently hardens and solidifies after it is put in place.

The cavities *a b* in the contiguous teeth A B are excavated and prepared for receiving fillings in the usual way, with under-cuts and anchorages to insure a firm hold of the filling in the teeth, and plastic material O, such as amalgam, is inserted in the teeth, so as to fill the cavities and the space between the teeth, which amalgam is also molded upon the surface of the gum X between the teeth, so as to press firmly thereon between the teeth, and the plastic material of the filling is shaped to conform to the natural contour of the teeth, but without actual division of the filling material between the teeth, the filling when completed appearing as shown in Fig. 2. When the material of the filling solidifies and hardens, the teeth A and B will be rigidly connected and locked together, so that they cannot spread apart, and the filling will be in close contact with the gums and will completely close the space between the teeth, so that food cannot enter between the teeth or between the filling and the gum. By this method of locking the teeth together by means of the plastic filling if before treatment one of the teeth should be loose, as is frequently the case, it becomes locked to the sound tooth and is held firmly in its proper place.

In some cases, as an additional means of locking the teeth together and preventing the teeth from spreading apart, the floor of the cavity of each tooth is drilled, and in the drill-holes are inserted the hooks of the ends of a bar C, of platinum wire, formed with a hook at each end, the portion of the said bar between the hooks being arranged to stand slightly above the floor of the cavity, so that the plastic material of the filling may be pressed upon and around the bar, thus holding it rigidly in its place in the teeth. In other respects the filling is made and finished as before described.

In the example of three adjoining decayed teeth D E F, which it is desired to fill and lock firmly together, the cavities are excavated in the form of grooves extending through the teeth, and the cavities are prepared in the usual manner, as shown in Fig. 1, and the filling O is inserted, so as to close the cavities and conform to the contour of the natural teeth, and the material of the filling is, as before described, molded firmly upon the gum X between the teeth and is made to close the spaces between the teeth and form a body of the filling material, which extends continuously through the three teeth and along and upon the gum between the teeth, as shown in Figs. 2 and 4, thus locking the teeth firmly together. For the further strengthening of the teeth and to further assist in locking them together a hooked bar C', Fig. 1, similar to that already described, but longer, to adapt it to a greater number of teeth, is inserted in the outer teeth of the series, and the filling is pressed upon and around the bar, as in the other case, which thus becomes inclosed within the filling and adds strength thereto, as before described.

Where the natural teeth are absent between two decayed teeth G H, having cavities $c$ $d$ in adjacent faces, the said cavities are prepared for receiving plastic fillings in the usual way and the fillings are inserted, and the body of plastic material of which the fillings are formed is extended in one body across the space between the two teeth and molded and firmly pressed upon the face of the gum, connecting the teeth, as shown in Figs. 2 and 3, and forming a rigid body of material, which, in addition to this use as a support and connection for the teeth, may be used for the purpose of mastication, and this material may be molded or carved in imitation of natural teeth. This body of material is firmly locked to the teeth G H and forms not a bridge but a causeway between the said teeth.

In forming the fillings care is taken to mold them firmly upon the gums, so as to form a perfect contact therewith. The gum is thus made partly to support and carry the prolongations of the fillings of the teeth, while the close contact of the teeth with the gum and the naturally elastic or expansive quality of the gum operates to exclude and expel particles of food or deleterious matter from between the gums and the plastic fillings that are kept in contact with the gums.

As an additional means of strengthening the lock between the teeth G H and as a further support to the fillings, the floors of the cavities C D are drilled to receive the hooked ends of the bar $C^2$, of platinum wire, as shown in Figs. 1 and 5, and to increase the hold of the plastic material upon the bar $C^2$ the said bar is provided with lateral spurs $e$, which are secured in place by soldering or riveting, and upon and around the bar $C^2$ with its spurs $e$ the plastic material forming the fillings is pressed and molded, so as to inclose the bar within the filling, as before described.

In the perspective view, Fig. 2, is shown the appearance inside of the maxilla of the completed plastic filling between the natural teeth G H and also the appearance of the completed prolonged filling or causeway which is formed upon the gums.

In Fig. 3 the exterior section of the maxilla, showing the same parts, is presented.

In the example shown in Fig. 7, K represents a decayed and loosened natural tooth excavated and prepared for filling, with a strengthening-stay L applied thereto. This stay L consists of a hooked bar, the hook of which is inserted in the bottom of the cavity in the loose tooth K in the manner before described. The opposite end of the stay L is provided with a crescent-shaped head fitted against the adjacent tooth M, supposed to be a firm natural tooth, with the intent to prevent forward and lateral motions of the ailing teeth. As in Fig. 8, the filling of plastic material O is now applied to the tooth K and carried down into the space between the teeth K M and molded upon the gum thereof, as before described, and built up between the teeth K M and made to inclose the bar of the stay L and hold it firmly in place against the tooth M. In this manner the firm tooth M, without being bored or cut, is made to support and hold in place the loosened tooth K.

In discovering the peculiar use and application of amalgam, as herein set forth, a grand stride has been made in dental science. That any foreign substance could be pressed and immovably fixed without irritation upon so delicate a tissue as the human gum has heretofore been considered impossible and unworthy of professional consideration; but thorough and long-continued tests have proved the practice to be highly beneficent and preservative.

Having thus described my invention, I claim as new and desire to secure by Letters Patent—

1. That improvement in the art of dentistry which consists in combining with the teeth suitable plastic fillings which are extended between the teeth and are molded upon the gums, substantially as herein shown and described.

2. The combination, with connected plastic fillings inserted in two or more teeth, of a strengthening-bar inserted in the teeth and inclosed in the plastic filling, substantially as specified.

3. The combination, with fillings inserted in cavities in adjacent teeth, of a connective body of plastic material formed integrally with the fillings molded upon the gums and carved in imitation of teeth, substantially as specified.

JOSEPH W. CLOWES.

Witnesses:
E. M. CLARK,
EDGAR TATE.